United States Patent [19]

Koukal et al.

[11] Patent Number: 5,160,293
[45] Date of Patent: Nov. 3, 1992

[54] AIR GUIDE BOX

[75] Inventors: Heinz Koukal, Sindelfingen; Richard Düsterhöft, Böblingen; Hans Trube, Herrenberg, all of Fed. Rep. of Germany

[73] Assignee: Mercedes-Benz AG, Fed. Rep. of Germany

[21] Appl. No.: 757,635

[22] Filed: Sep. 11, 1991

[30] Foreign Application Priority Data

Sep. 12, 1990 [DE] Fed. Rep. of Germany ....... 4028899

[51] Int. Cl.$^5$ .............................................. B60H 1/24
[52] U.S. Cl. ..................................... 454/69; 137/382; 454/158
[58] Field of Search .................... 137/382; 251/13; 454/69, 143, 148, 158, 159

[56] References Cited

U.S. PATENT DOCUMENTS 3,683,784 8/1972 Matsui et al. .................. 454/159 X

FOREIGN PATENT DOCUMENTS 3720675 1/1989 Fed. Rep. of Germany .

*Primary Examiner*—Harold Joyce
*Attorney, Agent, or Firm*—Evenson, Wands, Edwards, Lenahan & McKeown

[57] ABSTRACT

An air guide box, particularly for installation in motor vehicles, has a part permanently located in a holder and a removable cover part for the replacement of, for example, an air filter insert. Actuating elements are fastened to the removable cover part and each of which operates an air butterfly also supported in the removable cover part. In order to avoid having to release specifically conduit connections required for the control of the actuating elements during the removal of the removable cover part, the conduit connections are run in sections in a wall of the removable cover part and of the permanently located part, respectively. A plug-in connection is provided in the joint between the two parts of the box, and is separated during the removal of the removable cover part and joined together again when the cover part is replaced. The removable cover part can be configured as a frame for adjustable plates of a cooling air guide on a fan.

9 Claims, 3 Drawing Sheets

AIR GUIDE BOX

BACKGROUND AND SUMMARY OF THE INVENTION

The invention concerns the air guide box, particularly for a motor vehicle, in which an actuator for an air butterfly valve need not require installation space in the permanently located part of the air box while maintaining a reliable connection with the power source.

Air filter boxes which contain a replaceable air filter insert, for example, should be generally considered as air guide boxes. An air filter box is used in Mercedes-Benz's R 129. Pneumatic butterfly actuating elements for the controllable operation of main air butterflies are held in a part of this air filter box, which is permanently located in a body retention feature and which is essentially used for accepting a replaceable air filter insert for the vehicle passenger compartment ventilation and air conditioning. These actuating elements are located, together with the main air butterflies to which they are mechanically connected by an actuating drive, downstream of the replaceable air filter insert. This accommodation for the actuating elements substantially protects them from environmental effects. Sealing against, in particular, spray water, can be omitted.

A cover part of this air filter box, which is removable for the purpose of fitting a replacement filter insert, is configured as a scoop with air inlet openings. The scoop is sealed against the permanently located part in order to ensure that no air can flow past the filter to the fan and into the internal space of the vehicle. In this arrangement, the pneumatic connecting conduits for the actuating elements can be fixed externally on the permanently located part of the air filter box without difficulty. They must, however, be taken into the internal space of the box at a sealed conduit lead-through.

An arrangement of actuating elements for butterflies of an air guide box on the outside of the box is also shown in DE 38 20 431 A1, but no indication in given of how the connecting conduits of the actuating elements are run. In addition, air guide boxes for heat exchangers are shown in DE 38 36 371 A1 in which the airflow to be guided over the heat exchanger can be throttled to a greater or lesser extent by plates adjustable by a controllable actuator. At high coolant temperatures, the plates are parallel to the flow direction, and during a cold start, they are almost transverse to it and close the air passage in such a way as to achieve rapid heating of the coolant. It is apparent that the part of these air guide boxes covering the heat exchanger and in which the plates are held should be removable without removing the actual heat exchanger carrying the coolant. Also, it should be possible to remove any actuator which may be removed along with the plates.

A motor vehicle heating device located in a casing is shown in DE 33 33 066 C2 in which the heat exchanger is fastened on the inside of the pivotable cover of the casing. The connecting conduits of the heat exchanger are hoses which can be deformed when removing the cover for cleaning purposes and the like. This makes is unnecessary to interrupt the conduit connection.

An object of the present invention is to provide an air guide box with a removable cover part and a permanently located part in such a way that at least one actuator for an air butterfly no longer requires any installation space in the permanently located part of the air guide box while still maintaining its reliable connection to its power source.

The foregoing object has been achieved in accordance with the present invention by fastening the actuating element to the removable cover part of the air guide box, preferably in its internal space for protection against external influences, and supporting the air butterfly in the removable cover part.

Furthermore, in order to avoid having to interrupt specifically the conduit connection between each actuator and its power source, particularly at every removal of the removable cover part, a first section of the conduit is run within the wall of the removable cover part, a second section of the conduit is run within the wall of the permanently located part, and a plug-in connection is provided to connect the two sections of the conduit in the region of the joint between the removable cover part and the permanently located part.

Extensions of the conduit, which respectively provide permanent connection to the power source or to the actuator in the installed condition, are of course connected to the ends of the two sections pointing away from the plug-in connection.

The present invention has the further advantage that although the actuator can still be accommodated in a protected manner within the air guide box, it is accessible when the air box is opened by removing the cover, e.g. for maintenance purposes, and its connection to the power source is interrupted during the same procedure without any special operation being required for this purpose. If the air guide box is closed again, it is impossible to forget to remake the conduit connection because the plug-in connection is necessarily remade during the correct positioning of the removable cover part on the permanently located part. In addition, the problems of leading a continuous conduit into the closed air guide box are avoided from the outset.

Particularly in the case of correspondingly equipped air filter boxed, simple air filter insert replacement or cleaning procedures also remain unimpaired despite the actuator fastened to the movable cover part.

Apart from the differences caused by constructional features, it makes no difference whether an electrical conductor or fluidic conduit connection has to be made to the power source to suit the mode of operation of the actuating element. The power source can be the vehicle electrical system in the case of electrical actuating elements, for example, whereas in the case of pneumatic actuating elements, which are used in the air filter box mentioned, or their hydraulic equivalents, a hose or pipe connection has to be laid to a pump or the like acting as the power source.

It again makes no difference whether the actuating element is fastened to the removable cover part outside the air guide box. The required conduit run in sections in the walls of the air guide box still provides great advantages. Corresponding the above-mentioned DE 33 33 066 C2, it would also be possible with the present invention to use open conduit runs with sufficient excess length to connect the actuating elements. It would then be similarly possible to remove and set down the removable cover part of the air guide box without interrupting the conduit connection but in view of the tight installation space, particularly in motor vehicles, and also for reasons of cost, such excess lengths of conduits are, on the one hand, undesirable and, on the other hand, continually exposed to the danger of damage, e.g. kinking.

In available internal combustion engines, conduits for cooling water and lubricating oil extend between the cylinder block and the cylinder head within the walls of the two parts of the engine and are sealed by the cylinder head gasket in the joint. However, no indication of the arrangement of an actuator in or on an air guide box in accordance with the present invention can be derived therefrom.

An electro-pneumatic actuator shown in DE 36 37 404 C2 has an air conduit for applying alternating pressure to a diaphragm piston is provided through the wall of the two-part casing of the actuator and is similarly sealed in the joint by a flat gasket which penetrates in the region of the conduit. This actuator is in the removable cover part of an air guide box in accordance with the present invention.

Finally, locating a pneumatic coupling in a connecting conduit of a pneumatic locking device in a motor vehicle door in the region of the hinge between the body and the door is shown in DE 37 20 675 A1 and U.S. Pat. No. 2,888,287. This coupling can be released and closed by opening and closing the door. Here again, however, there is no external indication of the arrangement of an actuator on the removable cover part of an air guide box in accordance with the invention or of the proposed conduit run within the box walls.

A dust cap for a fluidic plug-in connection is shown in DE 34 26 089 A1. This cap closed a plug-in opening of the plug-in connection by way of a slit diaphragm after the plug-in connection has been interrupted. When the plug-in part is inserted into the plug-in opening, the plug-in part can be simply introduced through the slit in the diaphragm. This dust cap has no sealing function with respect to the plug-in connection itself and the sealing function is, in fact, undertaken by a separate sealing ring. By using such a dust cap in the plug-in connection of the two sections of the conduit (the dust cap being preferably provide in one piece with a seal for the actual plug-in connection), it is possible in particular in the air filter box application, to prevent dirt particles falling from the insert from penetrating into the conduit section, which extends within the wall of the permanently located box part, during filter insert replacement.

BRIEF DESCRIPTION OF THE DRAWINGS

These and other objects, features and advantages of the present invention will become more apparent from the following detailed description of a presently preferred embodiment when taken in conjunction with the accompanying drawings wherein.

DETAILED DESCRIPTION OF THE DRAWINGS

Figure 1:
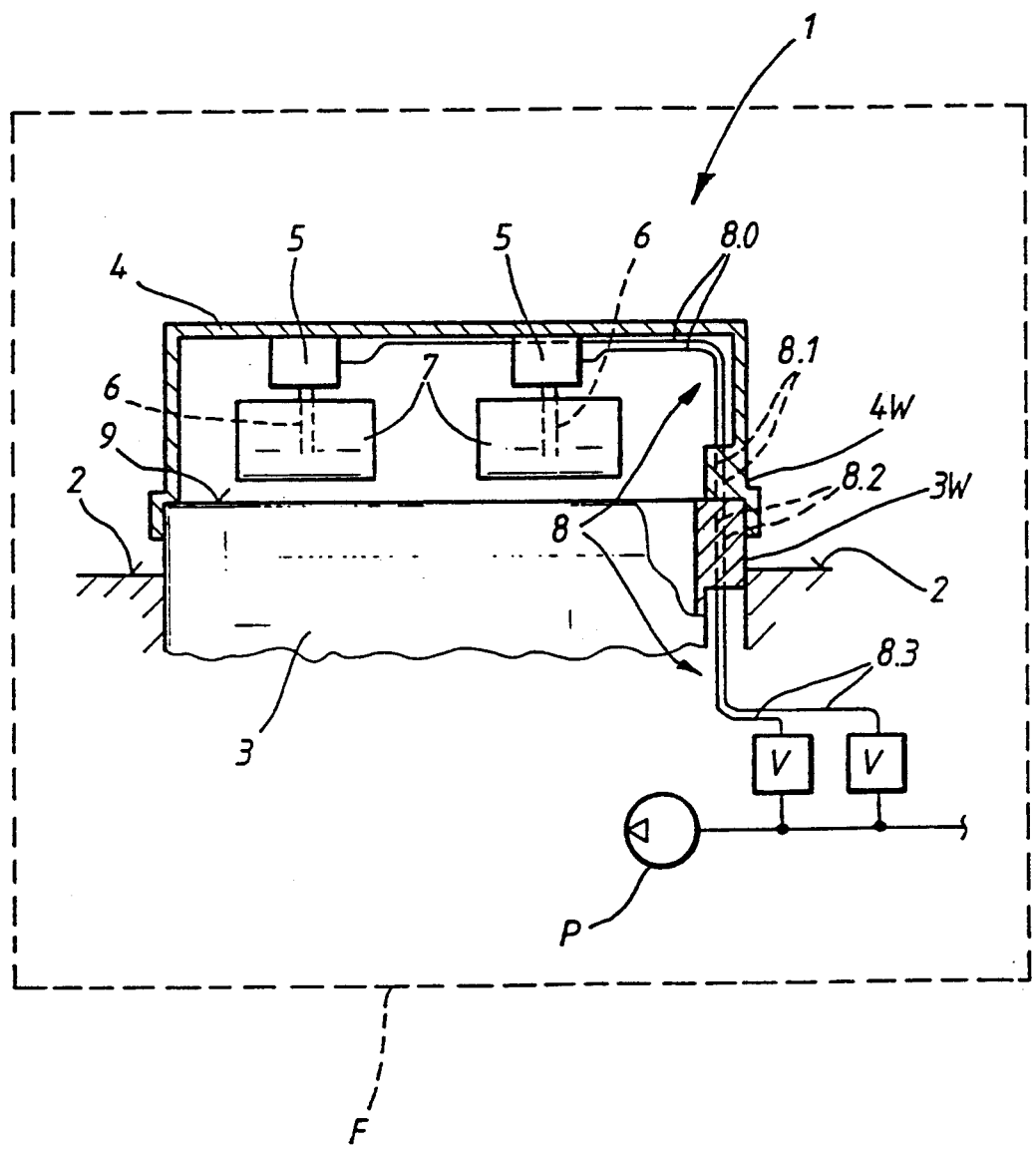
FIG. 1 is a schematic view of an overall arrangement of an air guide box of the present invention, in which two actuating elements, each with an air butterfly, are located in the removable cover part of the air guide box and the two actuating elements are connected to a power source by conduits extending in section in the box walls of the air filter box.

An overall arrangement of an air guide box designated generally by the numeral shown in FIG. 1 has a part 3 permanently located in a holder 2. A removable cover part 4 is fastened onto the part 3. The box 1 can be, for example, installed in the engine compartment of a motor vehicle F indicated only by a dashed line frame. The removable cover part 4 forms a tightly closing cover for the air guide box 1, in which two known vacuum actuating elements 5 are fastened on the inside. These elements act, in turn, via conventional mechanical connections 6 (and thus only shown symbolically), on air butterflies 7 which are pivotably supported in the removable cover part 4. Each of the actuating elements 5 is connected via a conduit 8, which consists of a plurality of sections (8.0 to 8.3), to its own switchable valve V which is, in turn, connected to a power source P (e.g., a vacuum pump). In order to operate the actuating elements 5, the valves V can be switched automatically or manually into an open position in which the power source P is connected via the respective conduit 8 to the corresponding actuating element 5 and can evacuate its working chamber. The corresponding air butterfly is opened thereby (or also closed, depending on the configuration).

The sections of the conduit 8 comprise an inner section 8.0 supported at least at points in the removable cover part 4. The inner section 8.0 connects the pneumatic connection of one of the actuating elements 5 permanently to a first section 8.1 which extends within a wall 4W of the removable cover part 4, e.g. is formed in the latter as a channel or hole. The first section 8.1 emerges in a joint region 9 which runs round between the removable cover part 4 and the permanently located part 3 of the air guide box 1. The first section 8.1 further emerges into a second section 8.2 which is, in turn, formed in a wall 3W of the permanently located part 3. A plug-in connection tightly closed towards the outside (described below by reference to FIG. 2) is, of course, provided in the joint region 9. Finally, an outer section 8.3 is connected to the second section 8.2 and the other end of this section 8.3 is connected to the power source P via the valve V.

As may be seen from FIG. 1, the actuating elements 5 inside the air guide box 1 are protected to the greatest possible extent from external influences but are directly accessible for maintenance or test purposes after the removal of the removable cover part 4. Furthermore, no special operation for interrupting the conduits 8 is necessary because the sealed plug-in connection between the first and second sections 8.1 and 8.2 of the conduit 8 has been provided for this purpose. The conduit 8 are necessarily connected simultaneously with the replacement of the removable cover part 4 on the permanently located part 3. The correct position for placing the removable cover part 4 is, for example, ensured in a conventional manner by form coding the periphery of the air guide box running along the joint 9. It is also possible for the plug-in connection itself to be made part of the coding by suitable shaping.

Figure 2:
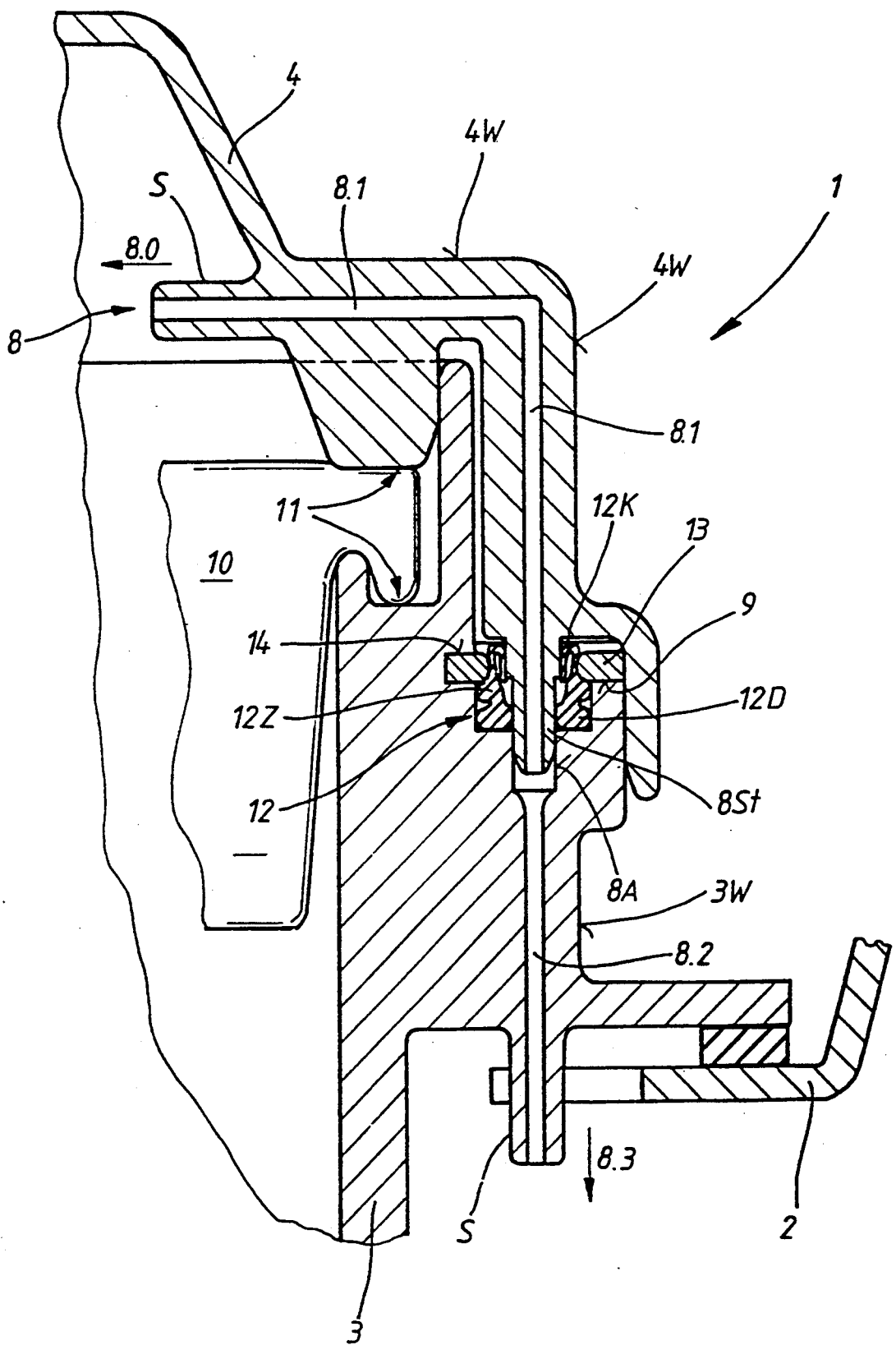
FIG. 2 is a cross-sectional partial view of a pneumatic plug-in connection in the region of a joint between the removable cover part and a permanently located part of an air filter box, wherein the plug-in connection connects together two sections of a connection conduit of an actuating element.

The plug-in connection for an individual conduit 8 is shown in the detailed sectional view in FIG. 2. This does not, in fact, show exactly the same arrangement of the first and second sections as that of the schematic arrangement in FIG. 1 but here again, the principle is shown on the conduit run in the section extending in the box over the joint 9 between the permanently located part 3 and the removable cover part 4 and of the plug-in connection provided in the region of the joint 9.

The air guide box 1 is here configured as an air filter box which contains a replaceable air filter insert 10. This is clamped all around at the edge between the permanently located part 3 and the removable cover part 4. The clamped edge 11 of the air filter unit 10 is sufficiently elastic so that it seals around the joint 9. The total airflow which is induced through the air butterflies 7 by a fan (not shown) located downstream of the air filter insert has therefore to pass through the air filter insert 10.

In order to fasten the removable cover part 4 to the permanently located part 3, either integrated elastic clip connections or separate retention clamps can be provided in known manner.

The first section 8.1 of the conduit 8 emerges in the internal space of the air guide box 1 with a mouthpiece S whereas its other end, pointing towards the joint 9, has a hollow cylindrical plug-in connection 8St. The second section 8.2 emerges at the joint end in a plug-in acceptance feature 8A whereas externally, it again emerges through a mouthpiece S. Hose pieces, for example, can be connected in the conventional manner to the two mouthpieces S in order to form the inner and outer section 8.0 and 8.3 of the conduit 8 shown in FIG. 1 and in order to complete the conduit. A seal 12 is inserted in the plug-in acceptance feature 8A. A retention part 13, which is inserted in an insertion guide 14 of the permanently located part 3, secures the seal 12 against withdrawal by the conduit plug-in mouthpiece 8St, which passes therethrough, during removal of the removable cover part 4.

The seal 12 can be in one piece or comprised of a sealing ring 12D and a dust cap 12K. These parts are held at an axial distance from one another by a sleeve-type intermediate piece 12Z. The sealing ring 12D deforms elastically and comes into close contact with the plug-in mouthpiece 8St and its external diameter also expands during the insertion of the plug-in mouthpiece 8St so that the sealing ring makes contact with the cylindrical plug-in acceptance feature at the outer periphery and can reliably seal the plug-in connection towards the outside.

Another embodiment of the seal could also be inserted in the plug-in acceptance feature so that it is firmly sealed at the outer periphery. Although the retention part 13 could thereby be omitted, replacing the seal after possible damage would also be made more difficult.

In the arrangement shown, the sections of the conduit 8 formed into the walls of the air guide box 1 can be seen to have the function of a conduit lead-through because the mouthpiece S of the first section 8.1 emerges in the internal space of the air guide box, while the mouthpiece 2 of the second section 8.2 emerges into the atmosphere.

The previously mentioned function of the plug-in connection as part of a form coding for positioning the removable cover part 4 can, for example, be achieved in such a way that the plug-in mouthpiece(s) 8St sits on a peripheral contour of the permanently located part 3 in any position other than the correct one and prevents the tight closure of the air guide box 1. In the correct position, the plug-in acceptance feature 8S is properly located as shown in FIG. 2 and therefore permits the tight sealing of the air guide box 1.

Figure 3:
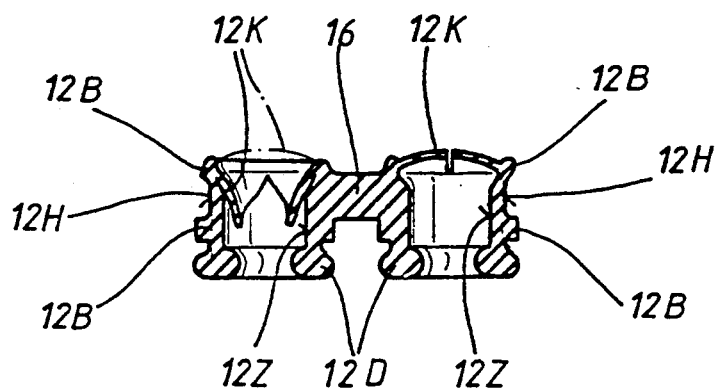
FIG. 3 is an isolated view of a one-piece multiple seal for a plug-in connection shown in FIG. 2.

FIG. 3 shows a sectional view of the seal 12 for a plug-in connection as shown in FIG. 2. The plug-in connection is here configured as a double unit to match the number of conduits to be sealed in FIG. 1 with the individual seals 12 being connected in one piece by an integral web 16. The material for the seal is preferably rubber of an elastomer plastic. A dust cap 12K is configured, in known manner, to function as a diaphragm with a slit which is closed when the plug-in mouthpiece 8St is withdrawn. This prevents dirt, in the form of course grains which can fall out of the air filter insert 10 during its replacement, from falling into the plug-in acceptance feature 8A immediately after the removal of the removable cover part 4 without special precaution. The unloaded position of the diaphragm 12K is shown in the right-hand part of the seal 12 in FIG. 3 while the left-hand part of the seal 12 and its dust cap 12K are shown in the elastically deformed open position but without the opening plug-in mouthpiece 8St. A diaphragm with two slits mutually at right angles (i.e. a cross-slit) is also another contemplated embodiment of the dust cap. The sectional view of FIG. 3 also shows that two intermediate pieces 12Z of the seal 12 are provided with outwardly protruding collars 12B. These collars 12B include between them in each case an axial section 12H. The seal 12 is enclosed by the retention part 13 in this section 12H, a positive connection being made by the collars 12B.

Figure 4:
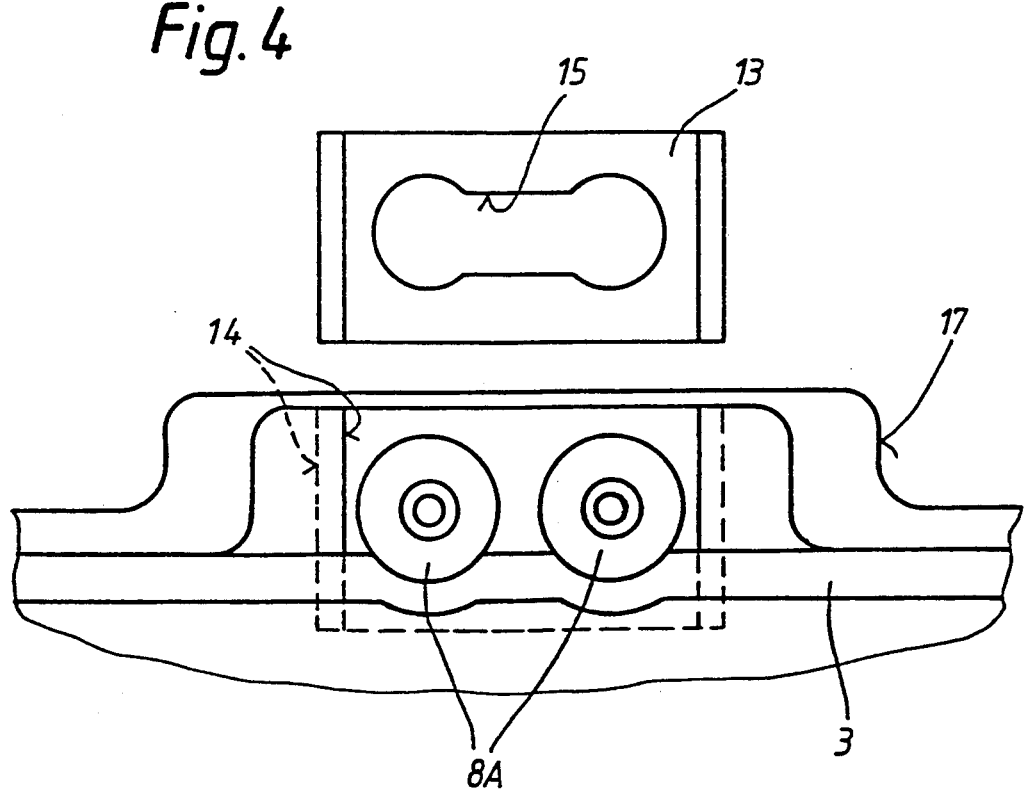
FIG. 4 is a plan view onto the plug-in acceptance feature of the plug-in connection shown in FIG. 2 with a retention part for the seal as shown in FIG. 3.

FIG. 4 shown a plan view onto the plug-in acceptance feature 8A of the plug-in connection which, as may be seen here, can be a multiple (in the illustrated embodiment, double) conduit, as shown in FIG. 1. The corresponding retention part 13 for the seal shown in FIG. 3 is shown in FIG. 4 before its insertion into the sliding guide 14. Several conduits of various actuating elements can, of course, be run, inserted and sealed as required in the manner described here. As can be easily seen in FIG. 4, the retention part 13 has a recess 15 into which can be pressed the seal 12 shown in FIG. 3 together with the web 16 with temporary elastic deformation of the collars 12B. In the assembled condition, the boundary of the recess 15 encloses the axial sections 12H and the web 16 of the seal 12. It may also be seen from FIG. 4 that the plug-in connection can be accommodated in an outward protrusion 17, also protruding inwardly if required of the permanently located part 3 of the air guide box 1. A corresponding protrusion is, of course, also provided on the removable cover part 4. It is only on these protrusions that the air guide box 1 requires the large wall thickness necessary to include the conduit sections.

A peripheral collar can be provided if necessary for the form coding described. Generally speaking, however, the outer periphery of the air guide box is geometrically asymmetrical or irregular along the joint so that there is no possibility in any event of incorrectly positioning the removable cover part. The protrusion 17 in the permanently located part 3 also contains the insertion guide 14 for the retention part 13 which in this case, for example, is slot-shaped. In order to assemble the seal 12, the retention part 13 is first pushed into the insertion guide 14 as far as the stop (from the right in FIG. 2), and the seal 12 is then pressed in from above through the recess 15 of the retention part 13 into the plug-in acceptance feature 8A. When the seal 12 is plugged into its installation position in the plug-in acceptance feature 8A, it prevents the retention part 13 from falling out of its insertion guide 14 while, because of the positive connection (axial sections 12H, collars 12B) to the seal 12, the retention feature secures the seal 12, as already mentioned, in the plug-in acceptance feature 8A against withdrawal.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An air guide box comprising:
    a holder;
    a permanently located part in the holder;
    a cover part selectively connectable to and removable from the permanently located part;
    at least one air butterfly supported in the removable cover part and adjustable relative thereto for controlling a variable airflow to be guided through the air guide box;
    at least one conduit;
    at least one controllable actuating element held on the removable cover part for adjusting the at least one air butterfly and operatively connected to a power source by the at least one conduit;
    a first section of the at least one conduit extending within a wall of the removable cover part and permanently connected to the actuating element;
    a second section of the at least one conduit extending within a wall of the permanently located part and connected to the power source; and
    a plug-in connection operatively configured to be selectively released and plugged in by removal or positioning of the removable cover part, for connecting the first and second sections of the at least one conduit in a joint region extending between the removable cover part and the permanently located part.

2. The air guide box according to claim 1, wherein the removable cover part is configured as a scoop with at least one induction opening which can be closed by the at least one air butterfly, and the removable cover part is configured to locate a replaceable air filter insert in the permanently located part.

3. The air guide box according to claim 1, wherein the removable cover part is configured as a frame for plate-type air butterflies of a cooling air guide to a heat exchanger and is adjustable via at least one actuating element.

4. The air guide box according to claim 1, wherein the at least one conduit is a hose conduit containing a seal for the plug-in connection.

5. The air guide box according to claim 4, wherein a separate retention part is operatively arranged for fastening the seal.

6. The air guide box according to claim 5, wherein the seal is positively connected to the separate retention part, and the seal fixes the retention part in a guide.

7. The air guide box according to claim 4, wherein the seal for the plug-in connection has a dust cap integrally connected with a sealing ring and is held at an axial distance therefrom.

8. The air guide box according to claim 7, wherein the seal is inserted in a plug-in acceptance feature associated at one end with the second section of the conduit.

9. The air guide box according to claim 1, wherein the plug-in connection comprises a form coding arrangement for unambiguously specifying the positioning of the removable cover part with respect to the permanently located part.

* * * * *